US009482331B2

(12) United States Patent
Schindler et al.

(10) Patent No.: US 9,482,331 B2
(45) Date of Patent: Nov. 1, 2016

(54) POWER SPLIT TRANSMISSION

(71) Applicant: Liebherr-Components Biberach GmbH, Biberach an der Riß (DE)

(72) Inventors: Viktor Schindler, Uttenweiler (DE); Clemens Christ, Biberach (DE)

(73) Assignee: LIEBHERR-COMPONENTS BIBERACH GMBH, Biberach an der Ris (DE)

( * ) Notice: Subject to any disclaimer, the term of this patent is extended or adjusted under 35 U.S.C. 154(b) by 167 days.

(21) Appl. No.: 14/243,944

(22) Filed: Apr. 3, 2014

(65) Prior Publication Data

US 2014/0213404 A1 Jul. 31, 2014

Related U.S. Application Data

(63) Continuation of application No. PCT/EP2012/003859, filed on Sep. 14, 2012.

(30) Foreign Application Priority Data

Oct. 6, 2011 (DE) ........................ 10 2011 115 002

(51) Int. Cl.
*F16H 47/08* (2006.01)
*B60K 6/445* (2007.10)
*F16H 47/04* (2006.01)
*F16H 37/08* (2006.01)
*F16H 37/10* (2006.01)

(52) U.S. Cl.
CPC ............... *F16H 47/08* (2013.01); *B60K 6/445* (2013.01); *F16H 47/04* (2013.01); *F16H 2037/0886* (2013.01); *F16H 2037/103* (2013.01); *F16H 2047/045* (2013.01); *F16H 2200/2023* (2013.01); *Y02T 10/6239* (2013.01)

(58) Field of Classification Search
None
See application file for complete search history.

(56) References Cited

U.S. PATENT DOCUMENTS

| 5,571,058 A | * | 11/1996 | Schmidt | ................. | B60K 6/365 |
| | | | | | 475/28 |
| 6,371,882 B1 | * | 4/2002 | Casey | .................... | F16H 3/728 |
| | | | | | 475/2 |
| 6,491,599 B1 | * | 12/2002 | Schmidt | ................. | B60K 6/365 |
| | | | | | 475/18 |

(Continued)

FOREIGN PATENT DOCUMENTS

| DE | 102006038068 A1 | 2/2008 |
| WO | 2008128865 A1 | 10/2008 |
| WO | 2011147397 A1 | 12/2011 |

OTHER PUBLICATIONS

International Search Report and Translation for Priority Document PCT/EP2012/003859 Dated Dec. 4, 2012.

*Primary Examiner* — Justin Holmes

(74) *Attorney, Agent, or Firm* — Troutman Sanders LLP; Ryan A. Schneider

(57) ABSTRACT

A power split transmission, in particular for a traction drive, having at least one drive shaft and at least one output shaft between which a mechanical first branch and a hydraulic or electrical second branch are provided that can be connected to one another at least in part by a planetary gear arrangement, wherein the second branch comprises a plurality of energy converters. The at least one drive shaft can be connected to a first energy converter and to a first connection element of the planetary gear arrangement, while the at least one output shaft can be connected to a second connection element of the planetary gear arrangement and the second and third energy converters can be connected to at least one or more further connection elements of the planetary gear arrangement and/or of the at least one output shaft.

23 Claims, 8 Drawing Sheets

(56) References Cited

U.S. PATENT DOCUMENTS 7,166,049 B2 * 1/2007 Saller .................... B60K 6/365
  475/207
2006/0217225 A1 * 9/2006 Hiraki .................... F16H 47/04
  475/72
2008/0096712 A1 * 4/2008 Hiraki .................... B60K 6/365
  475/5

* cited by examiner

POWER SPLIT TRANSMISSION

CROSS-REFERENCE TO RELATED APPLICATIONS

This is a continuation of International Application PCT/EP2012/003859, with an international filing date of 14 Sep. 2012, which claims the benefit of DE patent application Ser. No. 10 2011 115 002.5, filed on 6 Oct. 2011, the benefit of the earlier filing date of which is hereby claimed under 35 USC §119(a)-(d) and (f). The entire contents and substance of both applications are hereby incorporated by reference.

BACKGROUND OF THE INVENTION

1. Field of the Invention

The present invention relates to a power split transmission, in particular for a traction drive, having at least one drive shaft and at least one output shaft between which a mechanical first branch and a hydraulic or electrical second branch are provided that can be connected to one another at least in part by a planetary gear arrangement, wherein the second branch comprises a plurality of energy converters.

2. Description of Related Art

In mobile work machines with high demands on the tractive force on starting and with frequent reversals of the travel direction, as is in particular the case with wheeled loaders and crawler-mounted loaders, but also earthmovers or similar material handling vehicles, purely hydrostatic traction drives are frequently used to avoid the disadvantages typical of mechanically driven units with converters such as in particular the high consumption disadvantages on starting under load and the shift stage changes that are not completely free of tractive force interruptions. Hydrostatic drives allow a continuous speed variation that is e.g. possible over the complete speed range for vehicles with limited travel speeds such as wheeled loaders and crawler-mounted loaders or earthmovers. However, such purely hydrostatic drives have a considerably higher consumption in comparison with mechanical drives having higher travel speeds since the units cause high losses at high speeds.

In order so-to-say to combine the advantages of both transmission systems and drive systems, so-called power split transmissions have already been proposed that provide a force transmission from the drive shaft at the input side to the output shaft at the output side selectively by a mechanical first branch and a hydrostatic second branch, wherein it is possible, depending on the transmission configuration, to vary the power transmission by switch elements from purely mechanical to purely hydrostatic and vice versa or to vary the portion of the hydrostatic power transmission and the portion of the mechanical power transmission. A planetary gear has been used up to now in this respect via which the two power branches can be summed with one another in that the mechanical branch is led through the planetary gear and at least one hydrostat of the hydrostatic branch is coupled to the planetary gear.

However, the direction of rotation of the drive motor, which is frequently a diesel engine, brings about a problem with such power-split transmissions. While only the pump is pivoted through the zero degree position with purely hydrostatic drives and the volume flow is hereby reversed with the same input direction of rotation, this becomes a complex task in the mechanical branch since the speed of the drive motor in the mechanical branch is not easily simply reversible, at least not without an interruption of the tractive force or with a harmonic zero passage of the tractive force.

To achieve the direction reversal with such power split transmissions and so-to-say to avoid the named problem of the interruption of the tractive force in the mechanical line, it has already been proposed to superimpose a greater speed in the "correct" direction of rotation of the hydrostatic circuit on the "incorrect" direction of rotation of the mechanical branch. However, reactive powers are hereby transmitted in the transmission, which increases the consumption and makes larger hydraulic units necessary. With tractors, for example, this approach is used very successfully, which is, however, mainly due to the condition that tractors are primarily operated in a forward direction and to this extent the travel cycle portions with reverse travel, in which the named direction of rotation has to be compensated and reactive powers occur, is relatively small. With mobile work machines such as wheeled loaders or crawler-mounted loaders that have high reverse travel portions or a more-or-less balanced ratio between forward travel and reverse travel, the balance of such transmission systems is much worse since the named reactive power occurs here over a very considerable travel cycle portion in which reverse travel takes place.

Alternatively, it has therefore already been proposed to provide a reversing gear between the drive motor or the drive shaft and the planetary gear of the power split transmission in order to be able to reverse the fixedly predefined direction of rotation of the drive motor for the introduction into the mechanical branch of the power split transmission. Such power split transmissions having a reversing gear connected upstream of the mechanical branch are shown, for example, by documents DE 10 2008 001 613 A1 and DE 10 2008 040 449. In this respect, the hydrostats of the hydrostatic branch are associated with the planetary gear or with a manual transmission arranged downstream of it to be able to be sum the hydrostatic power with the mechanical power. A disadvantage of these already known solutions, especially on a use in mobile work machines with high reverse travel portions such as wheeled loaders, is, however, that due to the system the pump speed reaches its maximum value at speeds moving toward zero and this is likewise varied in its direction of rotation on a reversing with the reversing shift group, whereby the change in speed of the pump approximately corresponds in amount to twice the maximum speed. If the reversing process takes place at the speed required per se of, for example, a few tenths of a second, a borderline high acceleration of the pump thereby arises and the pump is hereby loaded up to or even above its load limit so that premature wear or even total failures occur. If, on the other hand, this is taken into consideration and the reversing process is carried out more slowly, the driver will perceive such a slow reversing with a felt "waiting period" at a speed of zero as a disadvantage, in particular if the driver is accustomed to a continuous reversing through a speed of zero without any pausing at a standstill from previously hydrostatically operated machines.

To alleviate this problem of reversing, while nevertheless being able to provide a power split for the named reasons, the document EP 2 280 192 A1 proposes a power split transmission in which the hydraulic pump is linked to the drive shaft or to the drive motor upstream of the reversing shift stage and thus unimpaired by the reversal of the direction of rotation so that the pump of the hydrostatic branch always rotates in the same direction and only the hydrostatic motor is coupled to the planetary gear. In this respect, by switching away the mechanical branch in a travel range of low speed, the power can be transmitted solely hydrostatically so that here the usual reversing can be realized gently and nevertheless fast by a corresponding pivoting of the pump through zero. However, the additionally required spur gear chain arranged in parallel with the planetary gear for the power transmission from the hydrostatic motor to the output and the regulation of the split transmission second drive position are disadvantageous in this respect. To cover a sufficiently large speed range in the second drive position, a plurality of shift stages having corresponding clutches are provided at the output side with the planetary gear to be able to set different speed ratios by engaging the clutches. Only a fine variation of the gear transmission ratios in the individual travel range stages is achieved by adjusting the hydraulic units if operation takes place with a power split. The transmission hereby becomes relatively complex and expensive and, due to the clutches and shift stages to be provided, high-maintenance and prone to wear. In addition, idling losses that impair the efficiency of the power split transmission arise due to the required clutches. Furthermore, a fall-off or at least a delay of the tractive force transmission occurs on the switching from purely hydrostatic operation into the power split operation. At the end of the purely hydrostatic travel range, the pump is usually at the maximum pivot angle and the motor is at a minimal or at least reduced pivot angle in order thus to realize the purely hydrostatic maximum possible output speed. In this respect, the hydraulic motor is connected to the annulus gear of the planetary gear that then necessarily also runs along idly at a relatively high speed without torque transmission. At the start of the power split travel range, the speed is increased in that a speed of the hydraulic branch that is increasing starting from zero is added via the annulus gear to the constant speed portion of the mechanical branch that is predefined by the diesel engine. For this purpose, the annulus gear and thus the hydraulic motor has to have a speed of zero or at least a low speed directly after the switchover, which is realized in that the pump is at a small or pivot angle or at a zero pivot angle and the motor is at a large or maximum pivot angle at this time. This has the consequence that the pump has to be pivoted back and the motor has to be pivoted outwardly in a very short time during the shift process. The state of the above-named fall-off in the power transmission is present in this time.

BRIEF SUMMARY OF THE INVENTION

Briefly described, in a preferred form, the present invention comprises an improved power split transmission of the initially named kind that avoids disadvantages of the prior art and further develops it in an advantageous manner. In particular a fast, continuous and low-wear reversibility should be achieved with a simple transmission design without impairing the efficiency of the transmission and without restricting the adjustment range for the gear transmission ratio. In addition, a tractive force transmission free of interruption should also be achieved on the switching between the different travel ranges so that e.g. pivot angles of hydrostats do not have to be adjusted during the switch.

This object is achieved in accordance with the invention by a power split transmission having at least one drive shaft and at least one output shaft between which a mechanical first branch and a hydraulic or electric second branch are provided that can be connected to one another at least in part by a planetary gear arrangement, wherein the planetary gear arrangement comprises a plurality of connection elements and the second branch comprises at least three rotary energy converters that can be connected to one another hydraulically or electrically; wherein the drive shaft can be connected to a first energy converter and to a first connection element of the planetary gear arrangement, the output shaft can be connected to a second connection element of the planetary gear arrangement, the second energy converter can be connected to a third connection element of the planetary gear arrangement or the drive shaft and the third energy converter can be connected to the third connection element or to a fourth connection element of the planetary gear arrangement or the output shaft.

It is preferably proposed to provide three or more rotary energy converters that can be connected to one another hydraulically or electrically and in this respect to arrange at least one energy converter coupleable with the at least one drive shaft and to arrange at least two energy converters coupleable with the planetary gear arrangement and/or with the output shaft and in this respect not to provide all energy converters in a respectively fixed manner as a motor or as a pressure generator or current generator, but rather to use at least one of the energy converters selectively as a motor or as a pump/generator depending on the travel range. In accordance with the invention, the at least one drive shaft can be connected to a first energy converter and to a first connector element of the planetary gear arrangement, while the at least one output shaft can be connected to a second connector element of the planetary gear arrangement and the second and third energy converters can be connected to at least one or more further connector elements of the planetary gear arrangement and/or the at least one output shaft. Operation can take place as required in power split or also only via the hydraulic/electrical branch or via the mechanical branch by the use of the at least three energy converters and their different linking to the drive shaft, on the one hand, and to the planetary gear arrangement connected thereto, on the other hand, with the energy converters being able to be operated in different combinations with one another, whereby a high variability of drive position results. A large spread can also be achieved, in particular on power split travel also without upstream or downstream shift stage transmission groups with a simultaneously continuous adjustability of the gear transmission ratio by the at least two energy converters that are directly or indirectly coupled to the planetary gear arrangement and/or to the output shaft or can, for example be coupled via a clutch assembly or shifting assembly. On the other hand, a purely hydraulic or electrical travel position, which can in particular achieve a simple reversing of the travel drive with a short, continuous, but nevertheless gentle zero passage, can also be realized by the at least one energy converter that is or can be directly or indirectly connected to the at least one drive shaft or to the upstream drive motor. At the same time, the named first energy converter that is linked to the drive shaft can advantageously increase the variability of the travel positions by variable operability both as a motor and as a pump/generator.

In a further development of the invention, a control apparatus for controlling the energy converters is advantageously provided and configured in this respect such that a respective different energy converter can be operated as a pressure generator or current generator depending on the desired output speed and/or on the desired output torque. Provision can in particular be made in this respect that the first energy converter and at least one of the two other energy converters can be operated alternately as a motor or as a pressure generator or current generator depending on the desired output speed. The variability of the drive positions can be directly further increased by the controllable switching capability of the energy converters between generator operation and motor operation. In the case of hydrostats, the named control apparatus can adjust the pivot angle. In the case of electrical machines, the frequency can be adjusted by a frequency inverter in the case of alternating current machines, for example; or the voltage can be adjusted by a voltage regulator in the case of direct current machines.

The linking of the named second and third energy converters can generally take place at different points of the planetary gear arrangement up to the output shaft or to the assembly connected thereto. Advantageously, however, both second and third energy converters are connected to the planetary gear arrangement to be able to utilize each of the energy converters for speed variation with respect to the mechanical branch in power split operation. An energy converter directly connected to the output shaft could be used only for varying the torque, whereas only the remaining energy converter connected to the planetary gear could be used for speed variation. The planetary gear arrangement advantageously accordingly comprises at least four connectors or connection elements, with the drive shaft and the output shaft being connected to the named first and second connection elements, while the second energy converter or the third energy converter are respectively connected to a third and fourth connection element.

The connection of the respective components to the named connection elements can in this respect generally be directly provided, for example such that the respective element is connected directly and rigidly, e.g. via a shaft, to the corresponding connection element. Alternatively, however, at least one or all of the named transmission elements, i.e. drive shaft, output shaft and energy converter, can also be indirectly connected to the respective connection element, for example with the interposition of a further transmission element or of a transmission stage, for example in the form of a spur gear pair and/or with the interposition of a clutch so that the corresponding component can be separated from and connected to the respective connection element. Each of the energy converters can therefore be directly or indirectly connected or connectable to the respective transmission element or connection element. This also applies to the other transmission elements that can be directly or indirectly connected or connectable to at least one respective further transmission element.

In an advantageous further development of the invention, the energy converters can be connected to the drive shaft or to the planetary gear arrangements without an interposition of clutches so that the energy converters always also rotate with the drive shaft or with the corresponding planetary gear element or likewise stand still on their standstill. Power losses in the region of such clutches can be avoided by such a clutch-free connection of the energy converters. The transmission can advantageously also be configured free of manual transmissions for speed variation. In a further development of the invention, the power split transmission can achieve speed changes simply by adjusting the energy converters and optionally by switching the mechanical branch on and off and optionally by a blocking of individual elements of the planetary gear arrangement.

In a further development of the invention, at least one of the connection elements to which the second and/or third energy converters are directly or indirectly connected or connectable can be locked by brake, with the brake being able to be directly associated with the connection element or with an element rotationally fixedly connected thereto. By means of such a brake, a power transmission via the planetary gear arrangement can also take place in an efficient manner with an energy converter switched off or set to zero.

It would, however, alternatively also be possible to stop the corresponding connection element and the transmission element of the planetary gear arrangement connected thereto by the energy converter connectable to it in order to set the corresponding travel range, for example in that the energy converter produces a sufficient torque in standstill that counters the forces or torques acting on the connection element. This could be effected by a corresponding control of the associated energy converter.

Alternatively or additionally, an overrunning clutch could be provided that allows a movement of the respective element in only one direction, but blocks it in the opposite direction. The use of a brake is, however, preferred since hereby power losses in the second branch are reduced and also a smaller energy converter can be used.

A brake can in particular be associated with the aforesaid fourth connection element to which the aforesaid third energy converter is directly or indirectly connected or connectable. Alternatively or additionally, a brake can also be associated with the third connection element of the planetary gear arrangement that is directly or indirectly connected or connectable to the second energy converter.

In a further development of the invention, a fourth energy converter, optionally also a fifth energy converter and even further energy converters can also be provided. Such a fourth energy converter can advantageously be connected to the at least one drive shaft, for example in order to be able to provide an additional power application in the sense of a boost function as is, for example, advantageous as a starting aid or on the occurrence of power peaks. Such a fourth energy converter can also be configured differently than the other energy converters depending on the configuration of the available energy sources. If, for example, a hybrid drive is provided, the fourth energy converter can be configured as an electric motor/generator, even if the other energy converters are hydrostats. In this respect, an electrical/hydraulic energy store can also be provided to which the named fourth energy converter can be connected.

The aforesaid control apparatus can generally be configured differently or can control the transmission in different manners. On the one hand, at least one of the energy converters, preferably at least two, and in particular all of the energy converters, can be configured as adjustable, with the control apparatus being able to adjust the respective energy converter individually or group-wise with individual adjustable energy converters or also all of the other adjustable energy converters. If the second branch is configured as hydraulic and if accordingly hydrostats are provided as energy converters, at least one hydrostat or the corresponding hydrostats can be adjustment units that are adjustable in displaced volume and whose displaced volumes can advantageously be adjusted continuously between zero and a maximum displaced volume or between a maximum negative displaced volume and a maximum positive displaced volume. The pivot angle of the respective hydrostat can in particular be adjusted by the control apparatus. The above-described functions can in particular be realized in a simple manner when at least two, or in particular all three, hydrostats are connected or connectable hydraulically in parallel. If, in contrast, the second branch is configured as electric and if accordingly electric machines are provided as energy converters, at least one electric machine, preferably at least two and in particular each of the electric machines can be designed as three-phase machines and can be connected via feedback-capable inverters to a common DC voltage intermediate circuit or can be connected thereto by corresponding switch elements so that e.g. the speed of the respective electric machine can be adjusted in motor operation, preferably between zero and a maximum positive or maximum negative speed via the named inverters.

In a further development of the invention, the transmission can also have at least one shift element that can be shifted by the control apparatus to change the shift status of the transmission. Such shift elements can in particular be clutches and/or brakes, but can in principle also be other shift elements such as connectable gear transmission stages whose shift status can be varied by the named control apparatus.

In a further development of the invention, the mechanical first branch of the transmission can in particular be decoupleable from the drive shaft by at least one clutch so that, in a first travel range, the output shaft can only be driven by the hydraulic or electrical second branch. The named clutch can advantageously be controlled by the control apparatus to be able to set the respective drive position in coordination with the control of the adjustable energy converter. If, in the named manner, the mechanical first branch is decoupled from the drive shaft, the control apparatus can in particular provided that, in the named first travel range, in motor operation the first energy converter that is coupled to the drive shaft is operated as a pump or generator and at least one of the second and third energy converters is operated as a motor.

The named clutch for switching off or switching in the mechanical first branch can be formed in an advantageous further development of the invention by a reversing shift group by means of which the direction of rotation of the first connection element of the planetary gear arrangement is reversible relative to the drive shaft. The named reversing shift group is in this respect advantageously provided between the drive shaft and the planetary gear arrangement. The decoupling of the first branch, however, does not necessarily have to be carried out by the named reversing shift group. A clutch could rather also be provided separately from or in addition to the named reversing shift group depending on how the reversing shift group is configured to be able to carry out the switching off or switching in of the first branch independently of an actuation of the reversing shift group. Advantageously, however, the clutch for switching the first branch off and in is integrated into the named reversing shift group, which can advantageously comprise two clutch units or one double-clutch unit, in order selectively to be able to switch in a forward stage or a backward stage.

If the transmission is power split, i.e. is operated with a first branch switched in, the control apparatus can advantageously adjust the energy converters in such a second travel range in which the output shaft is driven both by the first branch and by the second branch such that in motor operation the first energy converter that is connected to the drive shaft and the second energy converter that is connected to the planetary gear arrangement can each be operated selectively both as a motor and as a pressure generator or as a current generator, in particular such that in operation of the first energy converter as a motor the second energy converter is operated as a pump or generator and, conversely, on the operation of the first energy converter as a pump or generator, the second energy converter is operated as a motor. The achievable speed conversion can be considerably increased by such an operation reversal of the first and second energy converters.

Different sub-ranges can in particular be set and can be moved merging into one another in the named second travel range in which power is transmitted with a power split using both branches by a skilful switching or adjusting of the energy converters. Depending on the required torque or on the required speed, the portions can be coordinated by the power split such that either very high torques can be output at a simultaneously small speed or very small torques can be output at high speeds. A wheeled loader or a crawler-mounted loader can thereby be moved continuously from very low travel speeds to very high travel speeds.

In an advantageous further development of the invention, the second energy converter can be operated as pump/generator in this respect in a first sub-range of the named second travel range in motor operation, while the third energy converter is operated as a motor and the first energy converter is likewise operated as a motor. Alternatively or additionally, in a second sub-range of the named second travel range, the second energy converter can be operated in motor operation as a pump/generator, the third energy converter can be operated as a motor, while the first energy converter rotates idly without transmitting torque. Alternatively or additionally, in a third sub-range of the named second travel range, the first energy converter can be operated in motor operation as a pump and the second energy converter can be operated as a motor, while the third energy converter rotates idly without transmitting torque. Different speed ranges and/or torque ranges can be realized in the power split second travel range using the named sub-ranges and the corresponding settings of the energy converters, with a higher speed than with the named first sub-range in particular being able to be achieved with the named second sub-range and with a higher speed than with the named second sub-range in turn being able to be achieved with the named third sub-range. In this respect, a speed can in particular be achieved with the named first sub-range that preferably adjoins the first travel range seamlessly or in an overlapping manner in that the transmission is operated solely hydraulically or electrically, i.e. via the second branch. A very large speed conversion range can hereby be achieved overall.

At least one energy converter, advantageously also a plurality of energy converters, can advantageously be adjusted simultaneously in each of the named travel ranges or sub-ranges in order to achieve a continuous variation of the torque to be achieved and/or of the speed to be achieved. In a further development of the invention, for example, the first hydrostat in the named first sub-range of the second travel range can be adjusted between a full pivot angle and the zero position. Alternatively or additionally, the second hydrostat and/or the third hydrostat can be adjusted between the maximum pivot angle and the reduced pivot angle or the zero position consecutively or simultaneously in the second sub-range of the power split travel range. Alternatively or additionally, in the named third sub-range of the power split travel, an adjustment of the pivot angle of the first hydrostat and/or of the second hydrostat can be carried out.

In a further development of the invention, at least two of the energy converters can be connected in parallel hydraulically or electrically, with in particular all three energy converters being able to be arranged connected in parallel with one another in an advantageous embodiment of the invention so that volume flow or current coming from the first energy converter moves into both of the second and third energy converters and vice versa. Alternatively or additionally, the parallel connection of the energy converters can also be configured such that the energy output by any one of the energy converters in the form of volume flow or current can be passed on to each of the other energy converters. A number of different switch states can hereby be achieved. The energy flow acting on the energy converter connected in parallel in the form of hydraulic volume flow or of electric current can in particular also be made larger or smaller by adjusting an energy converter down, for example by setting the zero position, in which no power reception and output takes place. A fine adjustment of the travel ranges, and yet an adjustment variable over a large adjustment range overall can hereby be achieved.

The planetary gear arrangement itself can generally have different configurations, with the planetary gear arrangement advantageously being configured as multistage. The planetary gear arrangement can in particular be configured as a staged planetary gear that comprises a web having at least one staged planet, with a first sun being in operative connection with the first stage of the at least one staged planet, a second sun being in operative connection with the second stage of the named at least one staged planet and an annulus gear being in operative connection with at least one stage of the at least one staged planet. Four connection elements for the drive shafts and output shafts as well as the energy converters can hereby be provided in a simple manner.

Alternatively or additionally, however, a planetary gear arrangement can also be provided having two conventionally configured planetary stages, each having a sun; an annulus gear; and a web having at least one planet, with each planet stage per se having three connection elements. In an advantageous further development of the invention, a connection of the first planet stage can be coupled to a connection of the second planet stage and a further connection can be fixed so that the planet stage system coupled in this manner advantageously has four connection elements for connecting the named transmission elements. In an advantageous manner in this respect, the two webs can be coupled to one another and/or one of the annulus gears can be fixed.

In accordance with an advantageous embodiment of the invention, the drive shaft is directly or indirectly connected or connectable to the first sun of the planetary gear arrangement and the output shaft is directly or indirectly connected or connectable to the web or to one of the webs of the planetary gear arrangement. The second energy converter is advantageously directly or indirectly connected to the second sun, while the third energy converter can, in an advantageous further development of the invention, be directly or indirectly connected or connectable to the annulus gear of the planetary gear arrangement or to the non-fixed second annulus gear.

BRIEF DESCRIPTION OF THE DRAWINGS

Various features and advantages of the present invention may be more readily understood with reference to the following detailed description taken in conjunction with the accompanying drawing sheets.

DETAIL DESCRIPTION OF THE INVENTION

Figure 1:
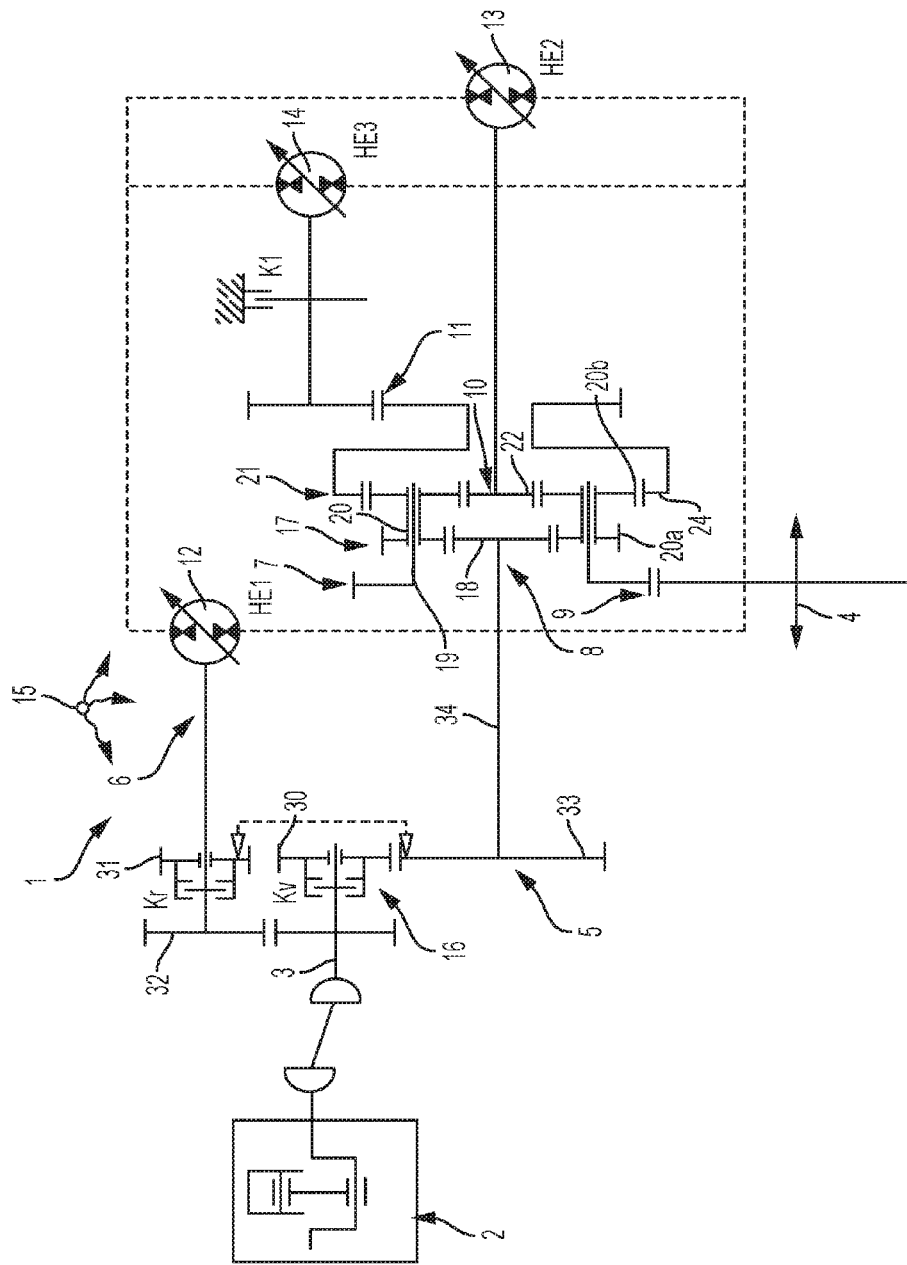
FIG. 1 is a schematic representation of a power split transmission in accordance with an advantageous embodiment of the invention, according to which three energy converters are provided in the form of adjustable hydrostats and the mechanical branch can be reversed by a reversing shift group in the direction of rotation relative to the drive shaft.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

As FIG. 1 shows, the power split transmission 1 can have an input shaft or output shaft 3 that can be driven by a drive motor, for example in the form of a diesel engine 2, with an oscillation or torsion damper or also other interposed transmission members being able to be provided between the drive motor 2 and the power split transmission 1.

A mechanical first branch 5 and a hydrostatic second branch 6 are provided between the drive shaft 3 and the output shaft 4 of the power split transmission 1, via which branches the power of the drive shaft 3 can be transmitted in motor operation onto the output shaft 4, with the division of the power components into the mechanical branch and the hydrostatic branch being able to be varied by a corresponding control of the transmission, as will be explained.

The mechanical first branch 5 is connected to the drive shaft 3 by a reversing shift group 16 for reversing the direction of rotation. The named reversing shift group 16 comprises a forward gear 30 that can be coupled by a forward clutch Kv to the drive shaft 3 so that it rotates together with and in the same direction as the drive shaft 3. On the other hand, the reversing shift group 16 comprises a reverse gear 31 that can be coupled via a reversing clutch Kr to a spur gear 32 that is in spur engagement with the drive shaft 3 or with a spur gear connected thereto and that rotates with an opposite direction of rotation to the drive shaft 3. The named forward and reverse gears 30 and 31 are in engagement with the input gear 33 of the mechanical first branch 5 so that depending on which of the forward and reverse clutches Kv and Kr respectively is in engagement, the input shaft 34 of the mechanical branch 5 rotates forward or backward. The arrangement is made in this respect such that the input gear 33 rotates at the same or almost the same speed by amount on backward and forward operation at the same respective speed of the drive shaft 3. The speed of the input gear 33 and thus of the input shaft 34 of the planetary gear train in this respect does not necessarily have to be the same by amount as the speed of the drive shaft 3, but can rather be larger or smaller by amount with respect thereto depending on the configuration of the interposed gears. If both forward clutches and backward clutches Kv and Kr are brought out of engagement, the mechanical first branch 5 is decoupled. The reversing shift group 16 to this extent simultaneously forms a clutch device for switching the mechanical first branch 5 off and in.

The mechanical first branch 5 is continued via a planetary gear arrangement 7 that connects the named input haft 34 of the first branch 5 to the output shaft 4 of the power split transmission 1, cf. FIG. 1.

In the embodiment shown in FIG. 1, the planetary gear arrangement 7 is configured as a staged planetary gear train that comprises a web 19 that bears at least one staged planet 20 whose first stage 20a is operationally connected to the first sun 18 of the first planet stage 17, while the second stage 20b of the staged planet 20 is operationally connected to an annulus gear 24 as well as to a second sun 22 of the second planet stage 21.

The planetary gear arrangement 7 thus has four connection points or connections. A first connection element 8 is formed by the first sun 18 and is connected via the input shaft 34, the input gear 33 and the reversing shift stage 16 to the drive shaft 3. A second connection element 9 is provided at the web 19 that is connected to the output shaft 4. A third connection element 10 is formed by the second sun 22 and is connected to a second energy converter 13 in the form of an adjustable hydrostat. A fourth connection element 11 is formed by the annulus gear 24 to which a third energy converter 14 is connected in the form of a likewise adjustable hydrostat, with a brake K1, by means of which the fourth connection element 11 and thus the annulus gear 24 can be blocked, being associated with the named fourth connection element 11 and/or with the named third energy converter 14.

Figure 7:
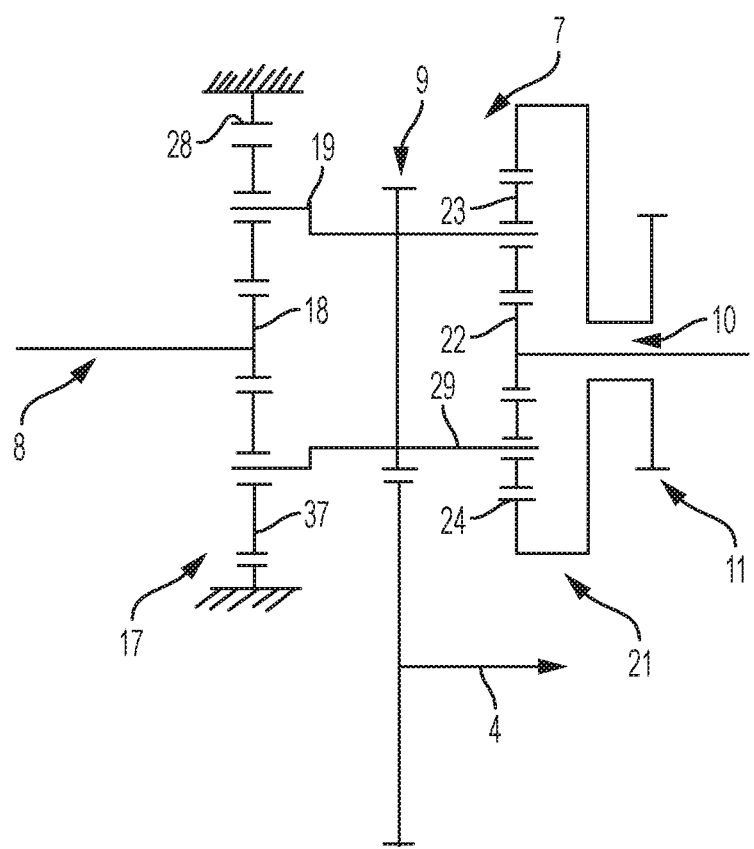
FIG. 7 is a schematic representation of the planetary gear arrangement of the power split transmission from the preceding FIGS. in accordance with an alternative embodiment, according to which the planetary gear arrangement comprises two planetary stages conventional per se and each having a sun, a web, at least one planet and an annulus gear, with the webs of the two planet stages being combined.

Alternatively to the embodiment shown in FIG. 1, the planetary gear arrangement 7 can also comprise two conventionally configured planetary stages 17 and 21 connected after one another, as FIG. 7 shows. The first planetary gear stage 17 in this respect comprises a first sun 18, a first web 19, which bears at least one planet, and also a first annulus gear 28. The second planet stage 21 analogously comprises a second sun 22, a second web 29, which bears at least one second planet 23, and also a second annulus gear 24. As FIG. 7 shows, the first and second webs 19 and 29 are connected to one another or are designed as a double web. The annulus gear 28 of the first stage is fixed, as FIG. 7 shows.

As FIG. 7 shows, the first sun 18 can here also form the first connection element 8 for the connection of the drive shaft 3. The second connection element 9 can be formed by the mutually connected webs 19 and 29 and can connect the output shaft 4. In a similar manner to the embodiment in accordance with FIG. 1, the second sun 22 forms the third connection element 10 for connecting the second energy converter 13, while the second annulus gear 24 forms the fourth connection element 11 for connecting the third energy converter 14.

In addition to the two already mentioned energy converters 13 and 14 that are connected to the planetary gear arrangement 7, the hydraulic second branch 6 of the transmission comprises a further energy converter 12 that is called a first energy converter 12 in the following and which, unlike the two other energy converters 13 and 14 is not connected to the planetary gear arrangement 7, but rather to the drive shaft 3, and indeed before the reversing shift group 16 or such that the first energy converter 12, which can likewise be configured as an adjustable hydrostat, rotates along with the drive shaft 3 independently of the shift state of the named reversing shift group 16, with the connection taking place via the spur gear 32 in the embodiment shown in FIG. 1 such that the hydrostat 12 rotates in the opposite direction relative to the drive shaft 3. The first energy converter 12 can be stepped up or also stepped down in speed with respect to the drive shaft 3 so that the energy converter 12 can have a speed advantageous for this energy converter and different from the speed of the drive shaft 3.

Figure 2:
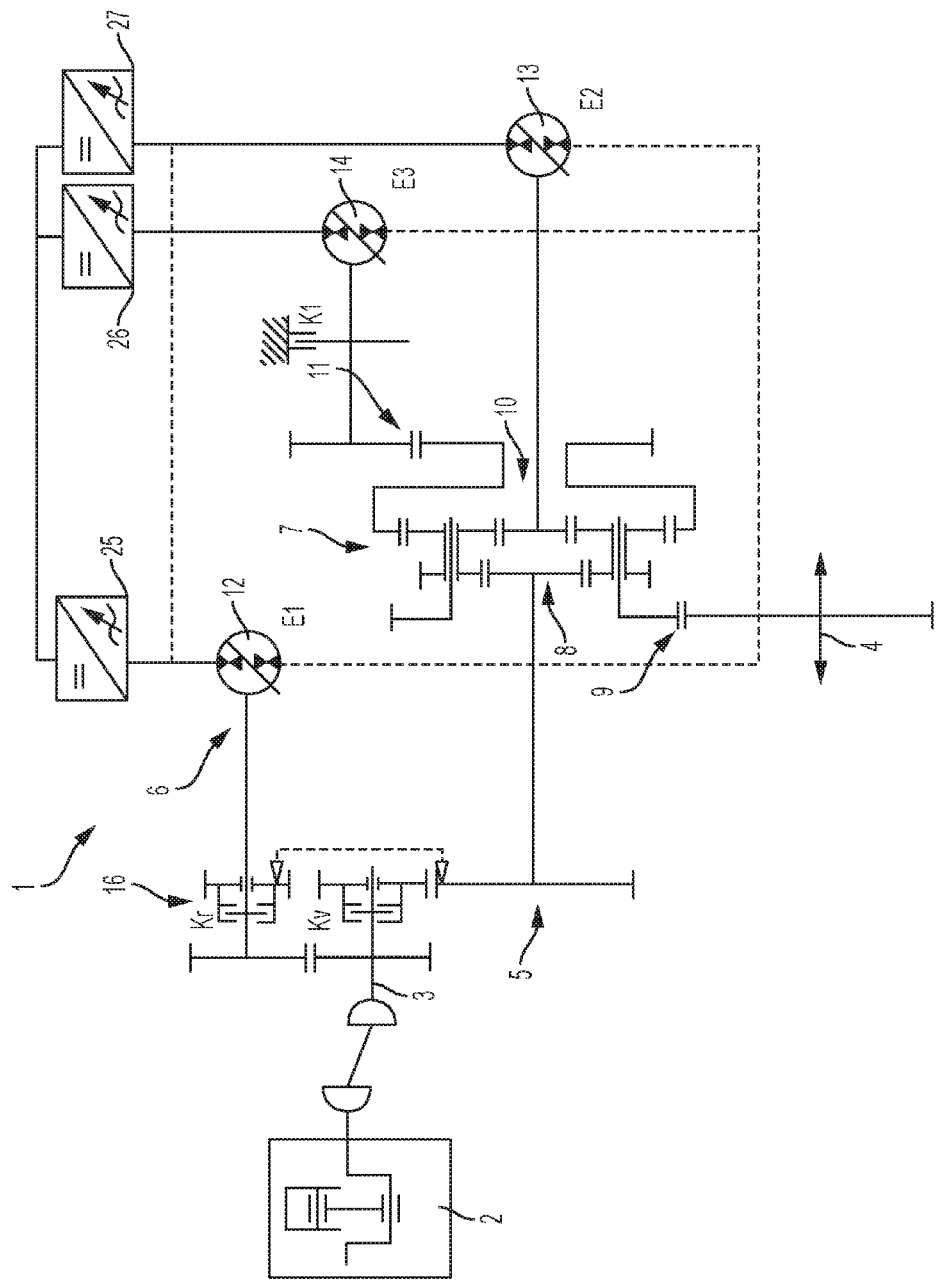
FIG. 2 is a schematic representation of a power split transmission in accordance with an advantageous embodiment of the invention, according to which three energy converters are provided in the form of electric machines having feedback-capable inverters and the mechanical branch can be reversed by a reversing shift group in the direction of rotation relative to the drive shaft.

While the energy converters 12, 13 and 14 are configured as respective adjustable hydrostats in the embodiment in accordance with FIG. 1, other energy converters, in particular electric machines, can also be used for the second branch 6 so that the second branch 6 is configured as electric. As FIG. 2 shows, in particular three electrical energy converters can be connected in a corresponding manner per se to the planetary gear arrangement 7 or to the drive shaft 3, with the named energy converters 12, 13 and 14 advantageously each being able to be configured as a three-phase machine that can be connected to a common DC voltage intermediate circuit via feedback-capable inverters 25, 26 and 27, cf. FIG. 2. Accordingly, the electrical machines can be adjusted with respect to their speeds via an adjustment of the named inverters and can be selectively operated as a motor or as a current generator in motor operation. In another respect, the embodiment in accordance with FIG. 2 corresponds to the embodiment in accordance with FIG. 1 so that reference is made to its explanation.

Using the power split transmission 1 in accordance with the FIGS. and depending on the required torque or on the required speed, the portions of the mechanically transmitted power and of the hydraulically/electrically transmitted power can be coordinated such that either very high torques can be output at a simultaneously low speed or very low torques can be output at high speeds, with the wheeled loader or the crawler-mounted loader, for example, being able to operate continuously from very low travel speeds to very high travel speeds. An interruption-free tractive force transmission can in particular also be achieved on switching over between the different travel ranges. The efficiency can be substantially improved by the specific configuration of the power split transmission, in particular at higher travel speeds. Furthermore, the speed of the drive motor 2 can be lowered, which brings about a further fuel saving.

Figure 3:
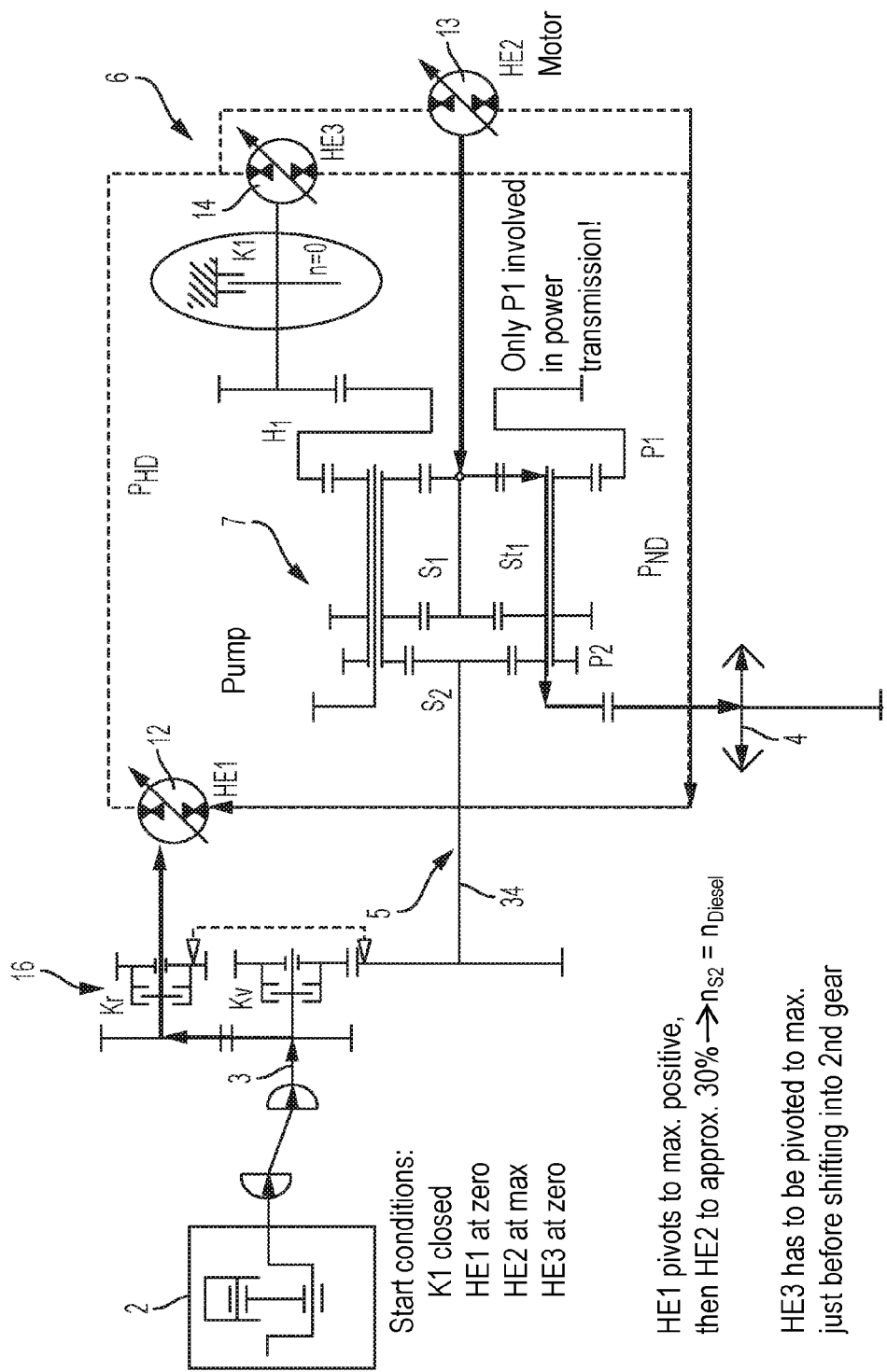
FIG. 3 is a schematic representation of the power transmission of the power split transmission from the preceding FIGS. with a switched-off mechanical first power branch.

In particular the following travel positions can be realized with the power split transmission 1 that will be explained in the following with reference to the hydraulic variant for a travel drive, for example for a wheeled loader or a crawler-mounted loader:

A high tractive force is typically required on starting. This can be generated in the present case in that the power split transmission 1 works purely hydrostatically in a first travel range, as FIG. 3 shows. For this purpose, the mechanical first branch 5 of the transmission is switched off or decoupled in that both clutches Kv and Kr of the reversing shift group 16 are opened.

Accordingly, only the hydrostatic second branch 6 works, with here, as FIG. 3 shows, the first hydrostat 12 working as a pump and being driven from the drive shaft 3. In the starting state, i.e. at standstill, the first hydrostat 12 is in this respect first set to pivot angle zero by the control apparatus 15, while the second hydrostat 13 can be set to a maximum pivot angle to be able to start the motor with a maximum torque. If a brake is provided as in the embodiment in accordance with the FIGS. shown, with the connection element 11 associated with the third hydrostat 14 being able to be blocked by it, the named brake K1 is closed in the starting state. As already initially explained, the stopping of the annulus gear 24 could, however, also take place via the named third hydrostat 14, with a blocking by means of the brake K1 being preferred. The third hydrostat 14 can hereby be set to zero so that the power split transmission works with only two hydrostats, namely the first hydrostat 12 and the second hydrostat 13.

To start, the first hydrostat 12 working as a pump in this respect is pivoted out from zero so that it provides an increasing volume flow, with the named first hydrostat 12 advantageously being able to be operated up to its maximum pivot angle to increase the speed. The high pressure pHD generated by the volume flow is applied to the second hydrostat 13 working as a motor, the second hydrostat being able to be moved out of its maximum outwardly pivoted position into a less far outwardly pivoted position, for example to approximately 30% of its maximum pivot angle, after the first starting or when the first hydrostat 12 is fully pivoted out. This adjustment of the pivot angle results in a speed of the second hydrostat 13 that increases away from zero and that correspondingly results in an increase in the speed at the second sun gear 22, which results, with a still annulus gear 24, in a corresponding increase in the speed of the web 19 and thus equally in an increase in the travel speed. The pivot angles of the two hydrostats 12 and 13 at the end of this travel range are selected such that the speed of the input shaft 34 of the mechanical first branch 5 is then adapted to the speed of the drive shaft 3 such that no speed difference or only a small speed difference is present at the clutch Kv. When this travel state, the so-called synchronous point, is reached, a switch can be made from the purely hydrostatic travel to power split travel.

For this purpose, on the one hand, the third hydrostat 14 is advantageously completely outwardly pivoted, i.e. is set to maximum torque capacity, in order, after the release of the brake K1, to be able to hold torque applied there or the annulus gear 24. Shortly beforehand or shortly afterward or at the same time, the mechanical first branch 5 is switched in by the forward clutch Kv of the reversing shift stage 16 being closed. The speed of the first sun 18 is thus in the further procedure directly proportional to the speed of the drive shaft 3 or, for example, to that of the diesel engine 2.

Figure 4:
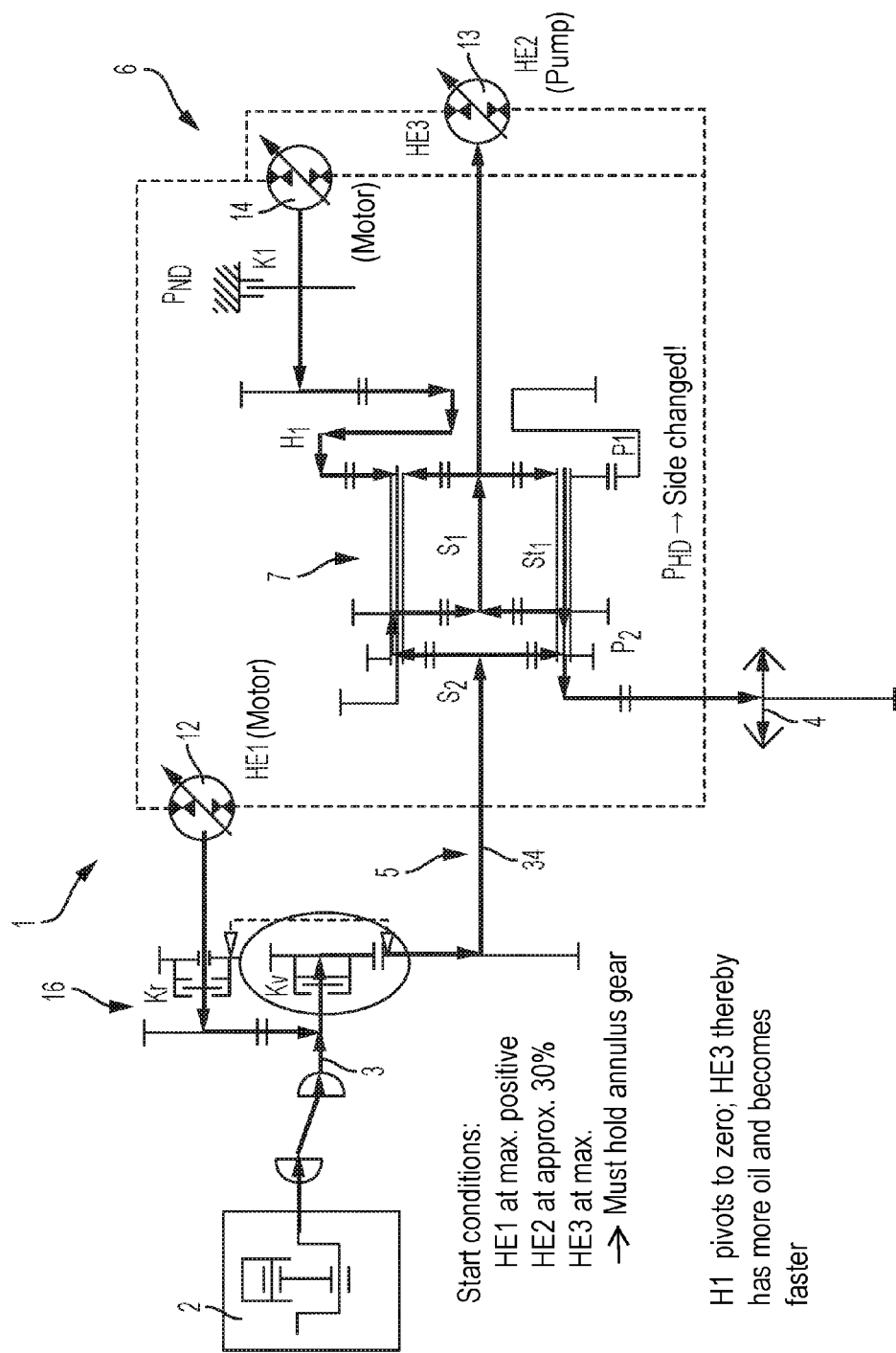
FIG. 4 is a schematic representation of the power transmission of the power split transmission from the preceding FIGS. with a switched-in mechanical first branch, with a first sub-range of the power split traveling being shown.

In a first sub-range of this power split second travel range, the second hydrostat 13 then works, as is shown by FIG. 4, as a pump in motor travel operation, while conversely the first hydrostat 12 is operated as a motor, cf. FIG. 4. Advantageously, the first hydrostat 12 can, however, be reduced in its pivot angle, in particular set to zero, by the control apparatus 15 in a further development of the invention. An increasing portion of the hydraulic volume flow provided, starting from zero, by the second hydrostat 13 hereby arrives at the third hydrostat 14 so that it increases its speed, starting from zero, working as a motor in motor drive operation. This results in a speed of the annulus gear 24 that increases away from zero and that is added at the first sun 18 to the speed of the mechanical branch 5 in the planetary gear and thus results in a further increase in the speed of the web 19 and thus in a further increase in the speed of the output shaft 4 and thus in a further increase in the travel speed. When the first hydrostat 12 is pivoted to zero, operation only takes place with the second and third hydrostats 13 and 14, naturally in addition to the mechanical first branch 5. At this point, the second sub-section of the power split second travel range begins.

Figure 5:
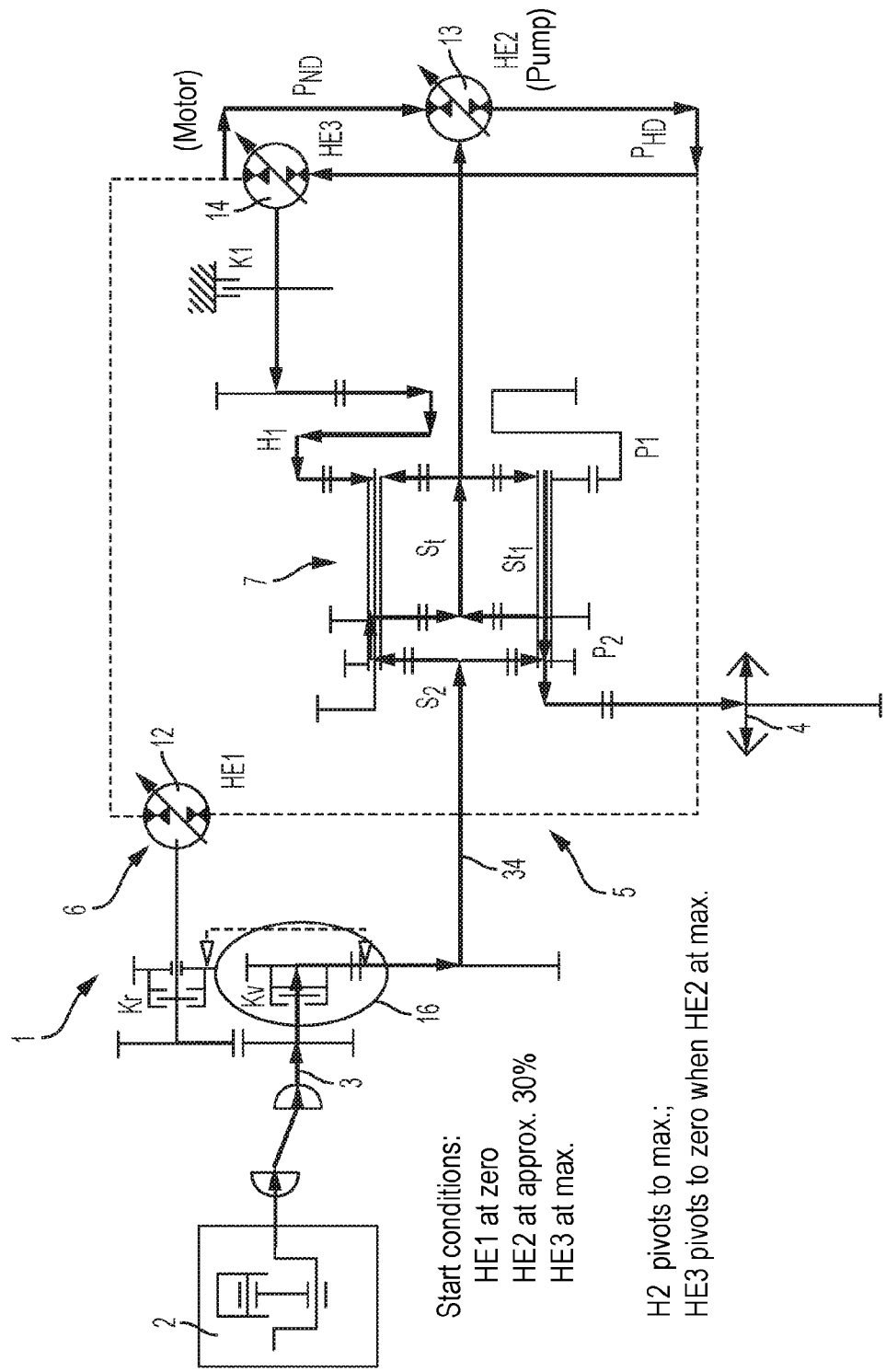
FIG. 5 is a schematic representation of the power transmission of the power split transmission from the preceding FIGS. with a switched-in mechanical first branch, with a second sub-range of the power split traveling being shown.

In this second sub-section of the power split second travel range, which FIG. 5 shows, the named two second and third hydrostats 13 and 14 can then be adjusted with respect to their pivot angles in order accordingly to vary the travel speed or the transmitted torque. In this respect, the second hydrostat 13 continues to work as a pump and the third hydrostat 14 as a motor in motor travel operation. The first hydrostat 12 is only entrained in this travel range and idles, i.e. runs torque-free or almost torque-free, since it is at pivot angle zero. In order to be able to travel at a higher travel speed, in particular the second hydrostat 13 can again pivot further outwardly, in particular up to the maximum stroke displaced volume position. At the same time, or offset in time, the third hydrostat 14 can have its displaced volume reduced, in particular down to the zero position. The speed of the hydrostat 14 is thereby further increased, which results in a further increasing speed of the annulus gear 24 and thus in a further increase in the travel speed and simultaneously in a decreasing speed of the second sun 22 and thus of the second hydrostat 13. When the zero position of the third hydrostat 14 has been reached, the speed of the second hydrostat 13 is equal to zero. At this point, the third sub-section of the power split second travel range begins.

Figure 6:
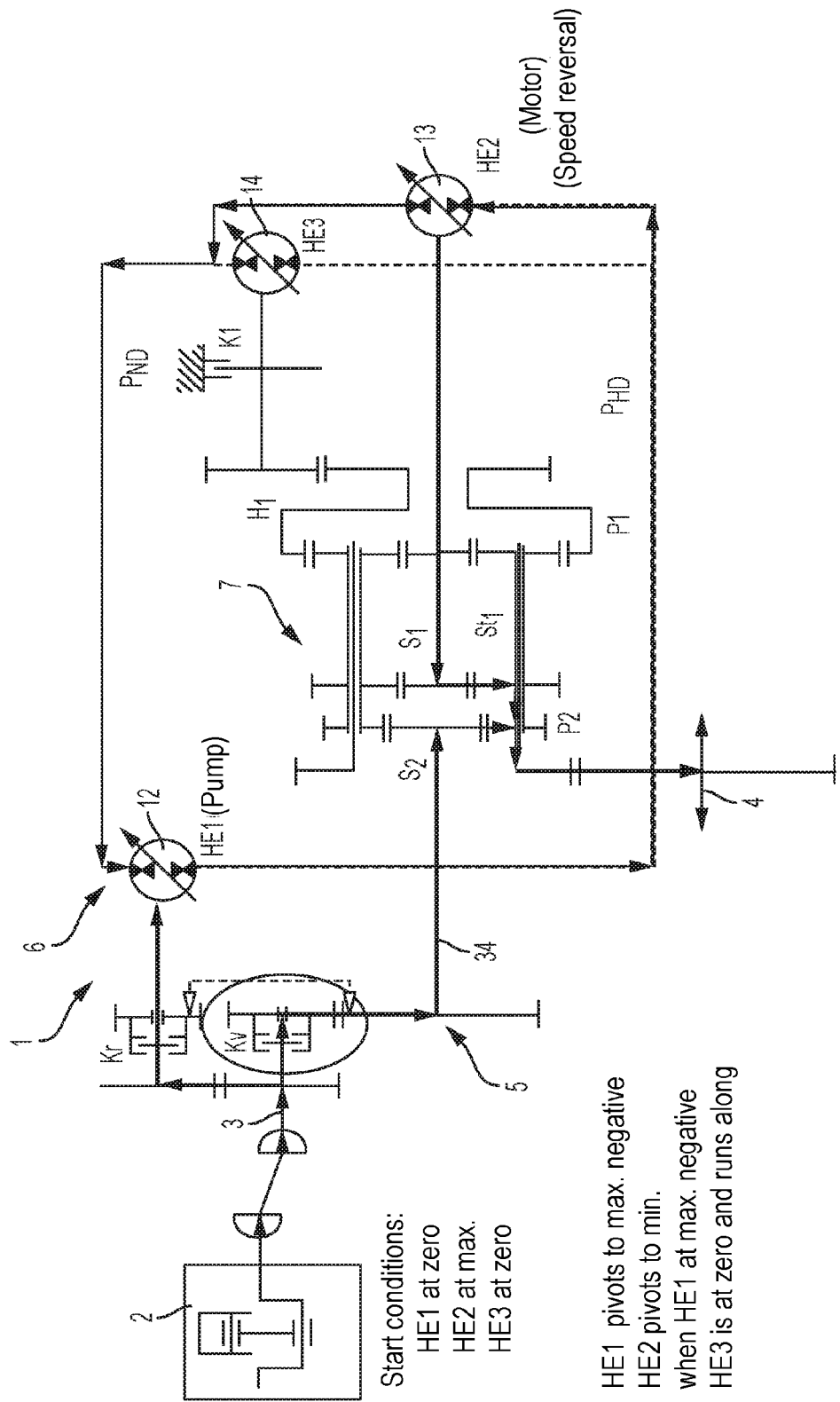
FIG. 6 is a schematic representation of the power transmission of the power split transmission from the preceding FIGS. with a switched-in mechanical first branch, with a third sub-range of the power split traveling being shown.

In order now to increase the travel speed even further, the first hydrostat 12 can now be pivoted outward into the negative direction away from zero in the third sub-range of the power split second travel range, as FIG. 6 shows. The hydraulic volume flow of the first hydrostat 12, which now again works as a pump in motor travel operation, hereby reverses so that the second hydrostat 13 now also starts to rotate in the opposite direction and changes from pump operation back to motor operation in motor travel operation. A negative drive speed at the second sun gear 22 results in a further increase in the speed of the web 19 and thus in a further increase in the travel speed. The third hydrostat 14 is only entrained in this travel range and runs free of torque or at least almost free of torque since it is at a pivot angle of zero. If the first hydrostat 12 is now pivoted outwardly to a maximum in the negative direction in order to regain travel speed again, the second hydrostat 13 working as a motor in motor travel operation is again pivoted back until the maximum travel speed is reached. The adjustment of the first and second hydrostats 12 and 13 respectively can here also take place simultaneously or with a time overlap.

In order also to be able to travel backward using the power split transmission 1, the first hydrostat 12 working as a pump on starting can first be adjusted in a manner known per se in purely hydrostatic operation continuously away from zero or through zero in the negative direction so that here, as with purely hydrostatic transmissions, a smooth, continuous and nevertheless fast reversing is possible. In order also to have the previously explained several travel ranges for reverse travel, in particular also to be able to use the power split travel, the input shaft 34 of the mechanical first branch 5 is driven in the reverse direction by the reversing shift group 16 for the backward travel in the power split range in that, as soon as the speed of the input shaft 34 of the mechanical first branch 5 has been adapted to the speed of the drive shaft 3 such that no speed difference or only a small speed difference is present at the clutch Kr, the reverse clutch Kr is closed. Accordingly, the input shaft 34 admittedly again rotates in accordance with the drive speed of the drive shaft 3, viewed by amount, but with a negative sign. The different power split travel positions then result in an analogous manner as previously described.

Figure 8:
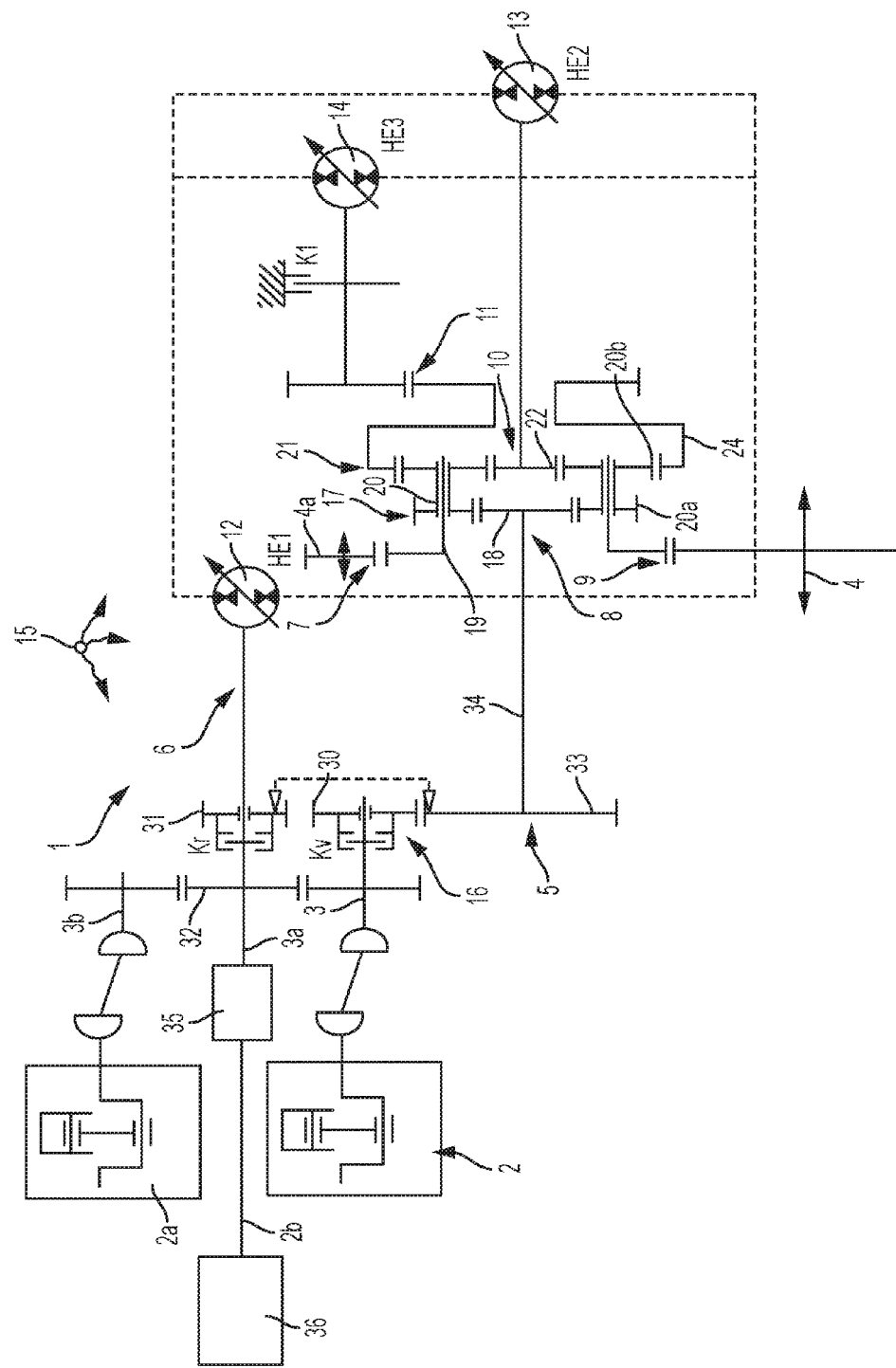
FIG. 8 is a schematic representation of a power split transmission in accordance with a further advantageous embodiment of the invention, according to which four energy converters are provided in the form of three hydrostats and one electric machine and the mechanical branch can be reversed by a reversing shift group in the direction or rotation relative to the drive shaft, with a second drive motor and a second output shaft additionally being provided.

As FIG. 8 shows, the power split transmission 1 can also have more than three energy converters. In the embodiment shown in FIG. 8, a fourth energy converter 35 can be connected to the drive shaft 3 in this respect. The named fourth energy converter 35 can be configured as hydrostatic or electric independently of the configuration of the other energy converters 12, 13 and 14, with an electric machine, for example in the form of a three-phase machine, being provided in the embodiment drawn in FIG. 8.

Additional torque can be applied to the drive shaft 3 via the additional fourth energy converter 35 in the sense of a boost function if power requirement peaks occur or on starting. In this respect, the energy converter 35 can be supplied with energy from different sides, with in accordance with FIG. 8, an electrical energy store 36 being provided in an advantageous further development of the invention from which the fourth energy converter 35 can be fed. The fourth energy converter 35 can advantageously work as a generator in coasting mode and can feed current into the energy store 36. When the fourth energy converter 35 is configured as a hydrostat, the energy store 36 can be a pressure reservoir.

FIG. 8 furthermore shows that the power split transmission 1 can be driven by more than one drive motor. In addition to the drive motor 2 from the preceding embodiments, a second drive motor 2a is provided in this respect that, as FIG. 8 shows, is connected to the spur gear 32. The drive motor 2a can likewise be a diesel engine, but can also be of a different configuration.

FIG. 8 further shows that the power split transmission 1 can also have more than one output shaft. At least one additional output gear 4a can advantageously engage at the web 19 of the planetary transmission.

In another respect, the configuration of the embodiment in accordance with FIG. 8 substantially corresponds to the embodiment in accordance with FIG. 1 so that in this respect reference is made to the preceding description, also to the description of the operation and operating states with reference to FIGS. 3 to 6.

In an exemplary embodiment, the present invention comprises a power split transmission having at least one drive shaft 3 and at least one output shaft 4 between which a mechanical first branch 5 and a hydraulic or electric second branch 6 are provided that can be connected to one another at least in part by a planetary gear arrangement 7, wherein the planetary gear arrangement 7 comprises a plurality of connection elements 8, 9, 10, 11 and the second branch 6 comprises at least three rotary energy converters 12, 13, 14 that can be connected to one another hydraulically or electrically; wherein the drive shaft 3 can be connected to a first energy converter 12 and to a first connection element 8 of the planetary gear arrangement 7, the output shaft 4 can be connected to a second connection element 9 of the planetary gear arrangement 7, the second energy converter 13 can be connected to a third connection element 10 of the planetary gear arrangement 7 or the drive shaft 4 and the third energy converter 14 can be connected to the third connection element 10 or to a fourth connection element 11 of the planetary gear arrangement 7 or the output shaft 4.

The planetary gear arrangement 7 can have at least four connection elements 8, 9, 10, 11 and the second energy converter 13 can be connected to the third connection element 10 of the planetary gear arrangement 7 and the third energy converter 14 can be connected to the fourth connection element 11 of the planetary gear arrangement 7.

At least one of the three energy converters, in particular the third energy converter 14, can be connected to a connection element of the planetary gear arrangement 7 with which a brake K1 is associated for braking or holding the named connection element.

A control apparatus 15 can be provided and configured for controlling the operating states of the energy converters and/or of the transmission shift state such that, in motor operation and in dependence on the desired output speed and/or on the desired output torque, at least one respective other energy converter 12, 13, 14 can be operated as a hydraulic/electric generator and/or, in coasting mode and in dependence on the desired output speed and/or on the desired output torque, at least one respective other energy converter 12, 13, 14 can be operated as a motor.

The control apparatus 15 can be configured such that, in motor operation, the first energy converter 12 and at least one of the second and third energy converters 13, 14 can alternately be operated as a hydraulic/electric generator in dependence on the desired output speed.

In an exemplary embodiment, at most one of the second and third energy converters 13, 14 is operated as a hydraulic/electric generator.

The first branch 5 can be decoupled from the drive shaft 3 by at least one clutch Kr, Kv and the output shaft 4 can be driven only by the second branch 6 in a first travel range, with, in the named first travel range in motor operation, the first energy converter 12 being able to be operated as a hydraulic/electric generator and at least one of the second and third energy converters 13, 14 being able to be operated as a motor.

The first energy converter 12 and the second energy converter 13 can each selectively be operated by the control apparatus 15 both as a motor and as a hydraulic/electric generator in a second travel range in which the output shaft 4 is driven both by the first branch 5 and by the second branch 6, preferably such that, on operation of the first energy converter 12 as a motor, the second energy converter 13 is operated as a hydraulic/electric generator and, on operation of the first energy converter 12 as a hydraulic/electric generator, the second energy converter 13 is operated as a motor.

The control apparatus 15 can be configured such that, in a first sub-range of the named second travel range in motor operation, the second energy converter is operated as a hydraulic/electric generator, the third energy converter is operated as a motor and the first energy converter 12 is operated as a motor and/or is switched free of torque and/or, in a second sub-range of the named second travel range in motor operation, the second energy converter 13 is operated as a hydraulic/electric generator, the third energy converter 14 is operated as a motor and the first energy converter 12 is switched free of torque and/or, in a third sub-range of the named second travel range in motor operation, the first energy converter 12 is operated as a hydraulic/electric generator, the second energy converter 13 is operated as a motor and the third energy converter 14 is switched free of torque.

A reversing shift group 16 for reversing the direction of rotation of the first connection element 8 of the planetary gear arrangement 7 relative to the drive shaft 3 can be provided between the drive shaft 3 and the planetary gear arrangement 7, with the reversing shift group 16 preferably having the at least one clutch Kr, Kr for decoupling the mechanical first branch 5 from the drive shaft 3.

The first energy converter 12 can be connected to the drive shaft 3 such that the energy converter 12 can be driven by the drive shaft 3 in a fixed direction of rotation irrespective of the position of the reversing shift group 16.

The planetary gear arrangement 7 can be configured as a staged planetary gear and has a web 19 having at least one staged planet 20 and has a first sun 18 that is in operational connection with the first stage 20a of the at least one staged planet 20 and has a second sun 22 that is in operational connection with the second stage 20b of the at least one staged plane 20 and has an annulus gear 24 that is in operational connection with at least one stage of the at least one staged plane 20.

The planetary gear arrangement 7 can configured as multistage, preferably with a first planet stage 17 comprising a first sun 18, a first web 19 having at least one first planet 37, and comprising a first annulus gear 28 and with a second planetary stage 21 comprising a second sun 22, a second web 29 having at least one second planet 23, and comprising a second annulus gear 24, with a connection of the first planet stage 17 preferably being coupled to a connection of the second planet stage 21 and with a planetary gear element being fixed so that the planetary gear arrangement has four connections.

The drive shaft 3 can be connected to the first sun 18 of the planetary gear arrangement 7.

The second energy converter 13 can be connected to the second sun 22 and/or the third energy converter 14 can be connected to the or to the second annulus gear 24 of the planetary gear arrangement 7.

The output shaft 4 can be connected to the web 19 or to the first or second web 19; 29 of the planetary gear arrangement 7.

At least two of the three energy converters 12, 13, 14 can be connected or connectable hydraulically or electrically or in parallel with one another.

At least two of the three energy converters 12, 13, 14 can be configured as adjustable hydrostats.

The present power split transmission can be a three-phase machine and can be connected to a common DC voltage intermediate circuit via feedback-capable inverters 25, 26, 27.

A fourth energy converter 35 can be provided that can preferably be connected to the at least one drive shaft 3.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A power split transmission comprising:
    a drive shaft;
    an output shaft;
    a mechanical first branch;
    a second branch comprising at least three energy converters;
        wherein a first energy converter is connected to each of the drive shaft, a second energy converter, and a third energy converter; and
        wherein the connection between the first energy converter and the second energy converter, and the connection between the first energy converter and the third energy convertor, are each selected from the group consisting of a hydraulic connection and an electrical connection; and
    a planetary gear arrangement connecting at least a portion of the mechanical first branch and the second branch;
    the planetary gear arrangement comprising a plurality of connection elements;
    wherein the mechanical first branch connects the drive shaft to the output shaft via the planetary gear arrangement;

wherein the second branch connects the drive shaft to the planetary gear arrangement; and wherein one of the connection elements of the planetary gear arrangement is connected to the drive shaft, a second one of the connection elements is connected to the output shaft, a third one of the connection elements is connected to one of the at least three energy converters, and a fourth one of the connection elements is connected to another one of the at least three energy converters.

2. The power split transmission of claim 1, wherein the second branch comprises a hydraulic second branch.

3. The power split transmission of claim 1, wherein the second branch comprises an electric second branch.

4. The power split transmission of claim 1, wherein two of the at least three energy converters are hydraulically connected to one another.

5. The power split transmission of claim 1, wherein two of the at least three energy converters are electrically connected to one another.

6. A power split transmission having at least one drive shaft and at least one output shaft between which a mechanical first branch and a second branch are provided and connected to one another at least in part by a planetary gear arrangement;
wherein the planetary gear arrangement comprises a plurality of connection elements;
wherein the second branch comprises at least three rotary energy converters;
wherein the drive shaft is connected to a first rotary energy converter of the at least three rotary energy converters and to a first connection element of the plurality of connection elements of the planetary gear arrangement;
wherein the output shaft is connected to a second connection element of the plurality of connection elements of the planetary gear arrangement;
wherein a second rotary energy converter of the at least three rotary energy converters is connected to
a third connection element of the plurality of connection elements of the planetary gear arrangement;
wherein a third rotary energy converter of the at least three rotary energy converters is connected to
a fourth connection element of the plurality of connection elements of the planetary gear arrangement; and
wherein the connection between the first rotary energy converter and the second rotary energy converter, and the connection between the first rotary energy converter and the third rotary energy converter, are each selected from the group consisting of a hydraulic connection and an electrical connection.

7. The power split transmission of claim 6, wherein the planetary gear arrangement comprises at least four connection elements;
wherein the second rotary energy converter is connected to the third connection element of the planetary gear arrangement; and
wherein the third rotary energy converter is connected to the fourth connection element of the planetary gear arrangement.

8. The power split transmission of claim 6 further comprising a brake for braking or holding at least one of the connection elements of the planetary gear arrangement.

9. The power split transmission of claim 6 further comprising a control apparatus for controlling operating states of one or both of the rotary energy converters and a transmission shift state such that, in a motor operation and in dependence on one or both of a desired output speed and desired output torque, at least one of the rotary energy converters is operated as one of a hydraulic and electric generator.

10. The power split transmission of claim 9, wherein in the motor operation, the first rotary energy converter and at least one of the second and third rotary energy converters are alternately operated as a hydraulic/electric generator in dependence on the desired output speed.

11. The power split transmission of claim 6 further comprising a control apparatus for controlling operating states of one or both of the rotary energy converters and a transmission shift state such that, in a coasting mode and in dependence on one or both of a desired output speed and desired output torque, at least one of the rotary energy converters is operated as a motor.

12. The power split transmission of claim 6 further comprising at least one clutch, wherein the first branch can be decoupled from the drive shaft by at least one of the at least one clutch;
wherein the output shaft can be driven only by the second branch in a first travel range, with, in the first travel range in the motor operation;
wherein the first energy converter is operable as one of a hydraulic and electric generator; and
wherein at least one of the second and third rotary energy converters is operable as a motor.

13. The power split transmission of claim 6 further comprising a reversing shift group for reversing the direction of rotation of the first connection element of the planetary gear arrangement relative to the drive shaft.

14. The power split transmission of claim 13, wherein the reversing shift group is located between the drive shaft and the planetary gear arrangement; and
wherein the reversing shift group comprises at least one clutch for decoupling the mechanical first branch from the drive shaft.

15. The power split transmission of claim 6, wherein at least two of the rotary energy converters are hydraulically connected.

16. The power split transmission of claim 6, wherein at least two of the rotary energy converters are electrically connected.

17. The power split transmission of claim 6, wherein at least two of the rotary energy converters are connected in parallel with one another.

18. The power split transmission of claim 6, wherein at least two of the rotary energy converters are configured as adjustable hydrostats.

19. The power split transmission of claim 6, wherein the planetary gear arrangement is configured as a staged planetary gear comprising a web having at least one staged planet, with a first sun being in operative connection with a first stage of the at least one staged planet, a second sun being in operative connection with a second stage of the at least one staged planet, and an annulus gear being in operative connection with at least one stage of the at least one staged planet.

20. The power split transmission of claim 19, wherein the drive shaft is connected to the first sun of the planetary gear arrangement.

21. The power split transmission of claim 19, wherein the output shaft is connected to the web of the planetary gear arrangement.

22. The power split transmission of claim 19, wherein the second rotary energy converter is connected to the second sun.

23. The power split transmission of claim 19, wherein the third rotary energy converter is connected to the annulus gear of the planetary gear arrangement.

* * * * *